(12) United States Patent
Koike et al.

(10) Patent No.: US 7,680,768 B2
(45) Date of Patent: Mar. 16, 2010

(54) INFORMATION PROCESSING APPARATUS AND METHOD, PROGRAM, AND STORAGE MEDIUM

(75) Inventors: Hiroyuki Koike, Kanagawa (JP); Tomohiro Tsunoda, Tokyo (JP)

(73) Assignee: Sony Corporation, Tokyo (JP)

( * ) Notice: Subject to any disclaimer, the term of this patent is extended or adjusted under 35 U.S.C. 154(b) by 149 days.

(21) Appl. No.: 11/756,477

(22) Filed: May 31, 2007

(65) Prior Publication Data

US 2008/0114732 A1 May 15, 2008

(30) Foreign Application Priority Data

Jun. 1, 2006 (JP) ............................ 2006-153339

(51) Int. Cl.
*G06F 17/30* (2006.01)

(52) U.S. Cl. .................................. 707/2; 707/3; 707/7

(58) Field of Classification Search ...................... 707/2, 707/3, 7
See application file for complete search history.

(56) References Cited

U.S. PATENT DOCUMENTS

| | | | | |
|---|---|---|---|---|
| 5,749,081 | A * | 5/1998 | Whiteis ........................ | 707/102 |
| 6,438,579 | B1 * | 8/2002 | Hosken ........................ | 709/203 |
| 6,636,836 | B1 * | 10/2003 | Pyo ............................... | 705/26 |
| 7,013,238 | B1 * | 3/2006 | Weare ........................... | 702/182 |
| 7,502,789 | B2 * | 3/2009 | Yao et al. ........................ | 707/7 |
| 2002/0016786 | A1 * | 2/2002 | Pitkow et al. ................... | 707/3 |
| 2003/0088480 | A1 * | 5/2003 | Berghofer et al. .............. | 705/26 |
| 2003/0110056 | A1 * | 6/2003 | Berghofer et al. .............. | 705/1 |
| 2003/0120634 | A1 * | 6/2003 | Koike et al. ...................... | 707/1 |
| 2003/0177110 | A1 * | 9/2003 | Okamoto et al. ................ | 707/3 |
| 2004/0254911 | A1 * | 12/2004 | Grasso et al. ................... | 707/1 |
| 2005/0144295 | A1 * | 6/2005 | Tsunoda et al. ................. | 709/228 |
| 2006/0195362 | A1 * | 8/2006 | Jacobi et al. .................... | 705/14 |
| 2006/0294093 | A1 * | 12/2006 | Yamamoto et al. .............. | 707/5 |
| 2007/0088720 | A1 * | 4/2007 | Neuneier et al. ............... | 707/100 |

(Continued)

FOREIGN PATENT DOCUMENTS

JP 2003-316818 11/2003

(Continued)

OTHER PUBLICATIONS

Japanese Office Action dated Apr. 28, 2009, in corresponding Japanese Application No. JP 2006-153339; 2 pgs.

*Primary Examiner*—Charles Rones
*Assistant Examiner*—Phuong-Thao Cao
(74) *Attorney, Agent, or Firm*—Finnegan, Henderson, Farabow, Garrett & Dunner, L.L.P.

(57) ABSTRACT

Disclosed herein is an information processing apparatus including: storage means for storing a recommendation degree that indicates a degree of recommendation of a content for a user; similarity degree calculation means for calculating a degree of similarity between a part of a user profile as updated and a content profile; recommendation degree variation calculation means for calculating, based on the degree of similarity calculated by the similarity degree calculation means, an amount of variation of the recommendation degree of the content for the user; and recommendation degree calculation means for calculating a new recommendation degree by adding the amount of the variation of the recommendation degree calculated by the recommendation degree variation calculation means to the recommendation degree stored in the storage means.

6 Claims, 8 Drawing Sheets

U.S. PATENT DOCUMENTS

2008/0071741 A1*  3/2008  Omi et al. .................. 707/3
2009/0018845 A1*  1/2009  Morel ......................... 705/1

FOREIGN PATENT DOCUMENTS

| JP | 2004-192460 | 7/2004 |
| JP | 2004-194107 | 7/2004 |
| JP | 2004-227354 | 8/2004 |

* cited by examiner

| USER ID | CONTENT ID | RECOMMENDATION DEGREE |
|---------|------------|-----------------------|
| 00001 | 00001 | 0.4 |
| 00001 | 00002 | 0.2 |
| 00001 | 00003 | 0.1 |
| 00001 | 00004 | 0.3 |

FIG. 9

INFORMATION PROCESSING APPARATUS AND METHOD, PROGRAM, AND STORAGE MEDIUM

CROSS REFERENCES TO RELATED APPLICATIONS

The present invention contains subject matter related to Japanese Patent Application JP 2006-153339, filed in the Japan Patent Office on Jun. 1, 2006, the entire contents of which being incorporated herein by reference.

BACKGROUND OF THE INVENTION

1. Field of the Invention

The present invention relates to an information processing apparatus and method, a program therefor, and a storage medium having the program stored therein. In particular, the present invention relates to an information processing apparatus and method that enable recommendation of a content, a program therefor, and a storage medium having the program stored therein.

2. Description of the Related Art

In recent years, there has been an increasing demand for a service of recommending a content, such as a television broadcast, music, or the like. Accordingly, development of a technique called a personalization technique has been progressing. The personalization technique is, for example, a technique of extracting a taste of a user based on his or her viewing history concerning television broadcasts to recommend a television broadcast which the user is likely to like.

In a related-art technique, positive history vectors are acquired; average taste vectors each indicating a general taste are acquired; cosine distances between the average taste vectors and the positive history vectors are calculated on a category-by-category basis; and based on the calculated cosine distances, the cosine distances are inverted to generate effect vectors on a category-by-category basis (see, for example, Japanese Patent Laid-open No. 2004-192460).

In another related-art technique, EPG (Electric Program Guide) data is received; metadata necessary for generating a program vector is extracted therefrom; a title, contents, etc., included in the metadata is subjected to morphological analysis to analyze them into words; items included in the metadata are vectorized to generate the program vector; based on a genre of a program of the received metadata, a corresponding effect vector is extracted; and the extracted effect vector is associated with the generated program vector (see, for example, Japanese Patent Laid-open No. 2004-194107).

SUMMARY OF THE INVENTION

Unfortunately, however, when the number of contents to be recommended or the size of a user profile (i.e., a profile of a user) is very large, a computation amount and computation time required for recommendation is enormous, resulting in inability to carry out real-time content recommendation, for example.

The present invention has been devised in view of the above situation, and an advantage of the present invention lies in enabling speedy content recommendation while maintaining the precision of recommendation at a high level.

According to one embodiment of the present invention, there is provided an information processing apparatus including: storage means for storing a recommendation degree that indicates a degree of recommendation of a content for a user; similarity degree calculation means for calculating a degree of similarity between a part of a user profile as updated and a content profile; recommendation degree variation calculation means for calculating, based on the degree of similarity calculated by the similarity degree calculation means, an amount of variation of the recommendation degree of the content for the user; and recommendation degree calculation means for calculating a new recommendation degree by adding the amount of the variation of the recommendation degree calculated by the recommendation degree variation calculation means to the recommendation degree stored in the storage means.

The part of the user profile as updated with respect to which the similarity degree calculation means calculates the degree of similarity may be a part of the user profile corresponding to a difference between the user profile before update and the user profile as updated.

The part of the user profile as updated with respect to which the similarity degree calculation means calculates the degree of similarity may be a part of the user profile corresponding to a specific attribute.

The similarity degree calculation means may calculate the degree of similarity with respect to a plurality of parts of the user profile as updated sequentially, each of the plurality of parts corresponding to a separate group of attributes.

The part of the user profile as updated with respect, to which the similarity degree calculation means calculates the degree of similarity may be a part of the user profile corresponding to a part of a difference between the user profile before update and the user profile as updated, the part of the difference corresponding to a specific attribute.

According to another embodiment of the present invention, there is provided an information processing method including the steps of: a) storing a recommendation degree that indicates a degree of recommendation of a content for a user; b) calculating a degree of similarity between a part, of a user profile as updated and a content profile; c) based on the degree of similarity calculated by step b), calculating an amount of variation of the recommendation degree of the content for the user; and d) calculating a new recommendation degree by adding the amount of the variation of the recommendation degree calculated by step c) to the recommendation degree stored by step a).

According to yet another embodiment of the present invention, there is provided a program for causing a computer to execute the steps of: a) storing a recommendation degree that indicates a degree of recommendation of a content for a user; b) calculating a degree of similarity between a part of a user profile as updated and a content profile; c) based on the degree of similarity calculated by step b), calculating an amount of variation of the recommendation degree of the content for the user; and d) calculating a new recommendation degree by adding the amount of the variation of the recommendation degree calculated by step c) to the recommendation degree stored by step a).

According to yet another embodiment of the present invention, there is provided a storage medium having the above program stored therein.

In one embodiment of the present invention, a recommendation degree that indicates a degree of recommendation of a content for a user is stored; a degree of similarity between a part of a user profile as updated and a content profile is calculated; based on the calculated degree of similarity, an amount of variation of the recommendation degree of the content for the user is calculated; and a new recommendation degree is calculated by adding the calculated amount of the variation of the recommendation degree to the stored recommendation degree.

As described above, according to the embodiments of the present invention, it is possible to recommend a content.

In addition, according to the embodiments of the present invention, it is possible to carry out content recommendation speedily while maintaining the precision of recommendation at a high level.

DETAILED DESCRIPTION OF THE PREFERRED EMBODIMENTS

Hereinafter, embodiments of the present invention will be described. Correspondence between the constituent features of the present invention and the embodiments that will be described in the following detailed description is exemplified as follows. Note that this preliminary description is meant to confirm that an embodiment that supports the present invention is described in the following detailed description. Therefore, even if there is an embodiment that is described in the following detailed description but not described in this preliminary description as corresponding to a constituent feature of the present invention, that does not mean that that embodiment does not correspond to that constituent feature. Conversely, even if a certain embodiment is described in this preliminary description as corresponding to a certain constituent feature of the present invention, that does not mean that the certain embodiment does not correspond to any other constituent feature.

Figure 3:
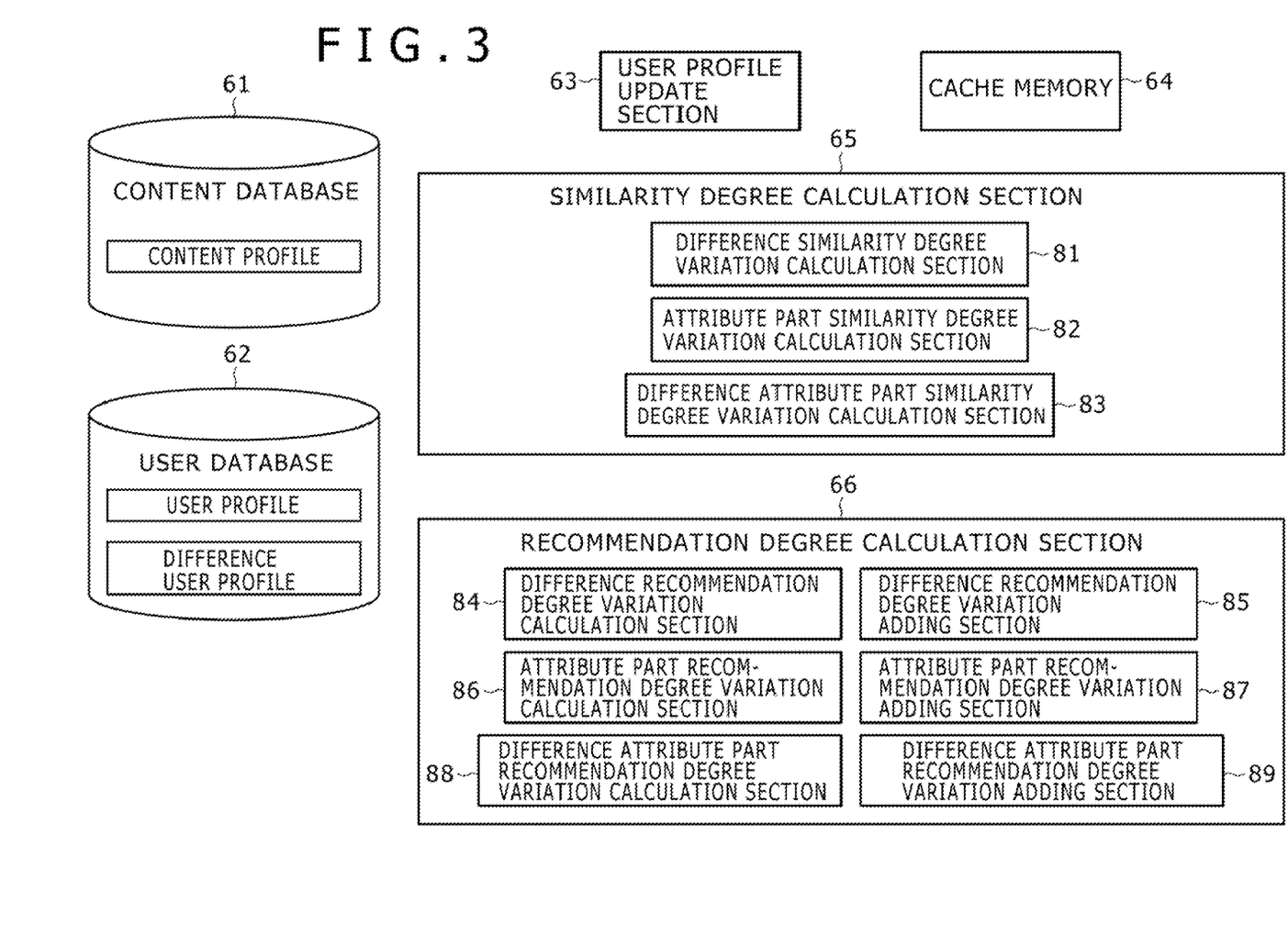
FIG. 3 is a block diagram illustrating a structure of a function of the server.

An information processing apparatus according to one embodiment of the present invention includes: storage means (e.g., a cache memory 64 in FIG. 3) for storing a recommendation degree that indicates a degree of recommendation of a content for a user; similarity degree calculation means (e.g., a difference similarity degree variation calculation section 81 in FIG. 3) for calculating a degree of similarity between a part of a user profile as updated and a content profile; recommendation degree variation calculation means (e.g., a difference recommendation degree variation calculation section 84 in FIG. 3) for calculating, based on the degree of similarity calculated by the similarity degree calculation means, an amount of variation of the recommendation degree of the content for the user; and recommendation degree calculation means (e.g., a difference recommendation degree variation adding section 85 in FIG. 3) for calculating a new recommendation degree by adding the amount of the variation of the recommendation degree calculated by the recommendation degree variation calculation means to the recommendation degree stored in the storage means.

Figure 7:
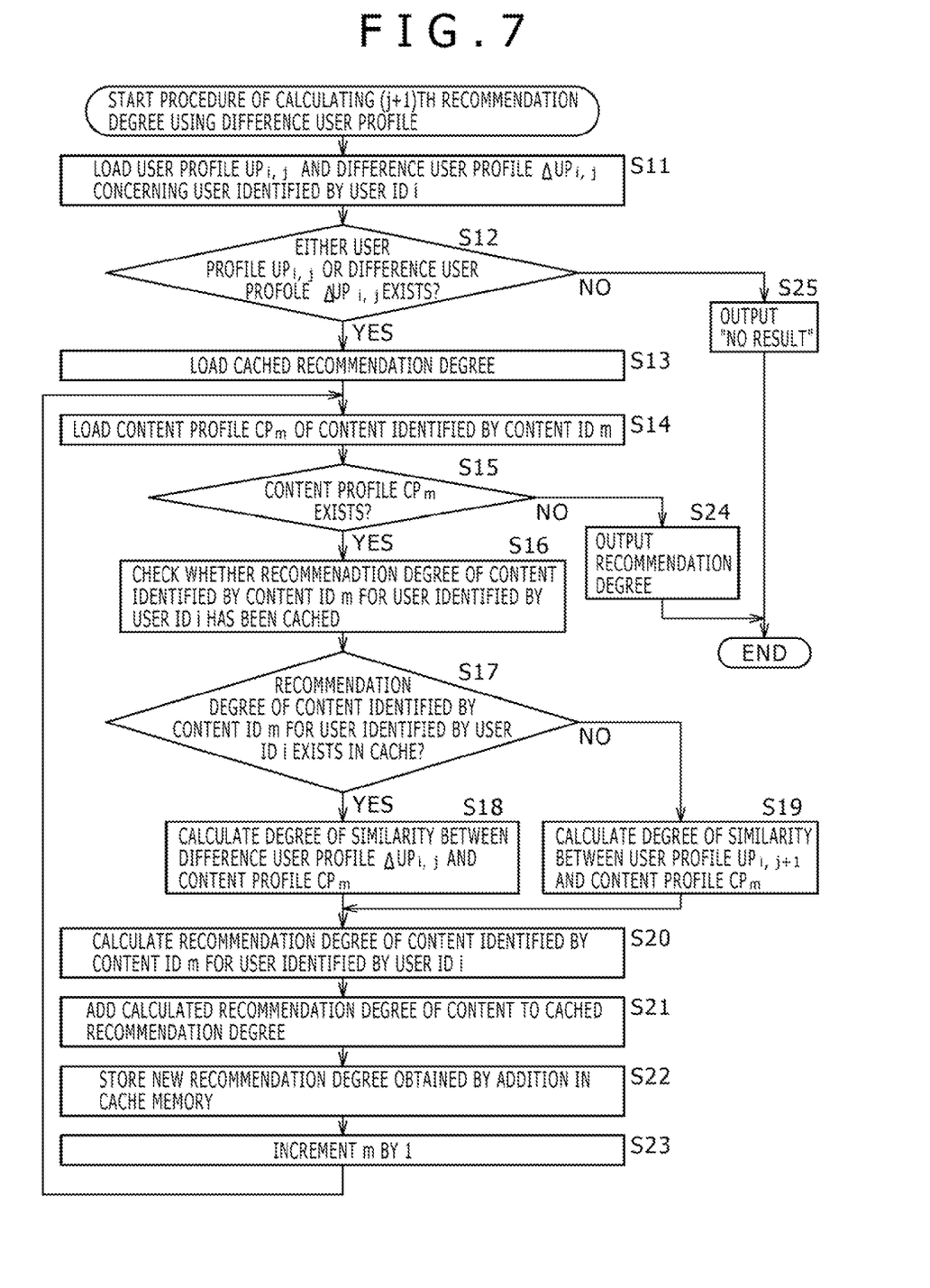
FIG. 7 is a flowchart illustrating a procedure of calculating a (j+1)th recommendation degree using the difference user profile.

An information processing method and a program according to one embodiment of the present invention include the steps of: a) storing a recommendation degree that indicates a degree of recommendation of a content for a user (e.g., step S22 in FIG. 7); b) calculating a degree of similarity between a part of a user profile as updated and a content profile e.g., step S18 in FIG. 7); c) based on the degree of similarity calculated by step b), calculating an amount of variation of the recommendation degree of the content for the user (e.g., step S20 in FIG. 7); and d) calculating a new recommendation degree by adding the amount of the variation of the recommendation degree calculated by step c) to the recommendation degree stored by step a) (e.g., step S21 in FIG. 7).

Figure 1:
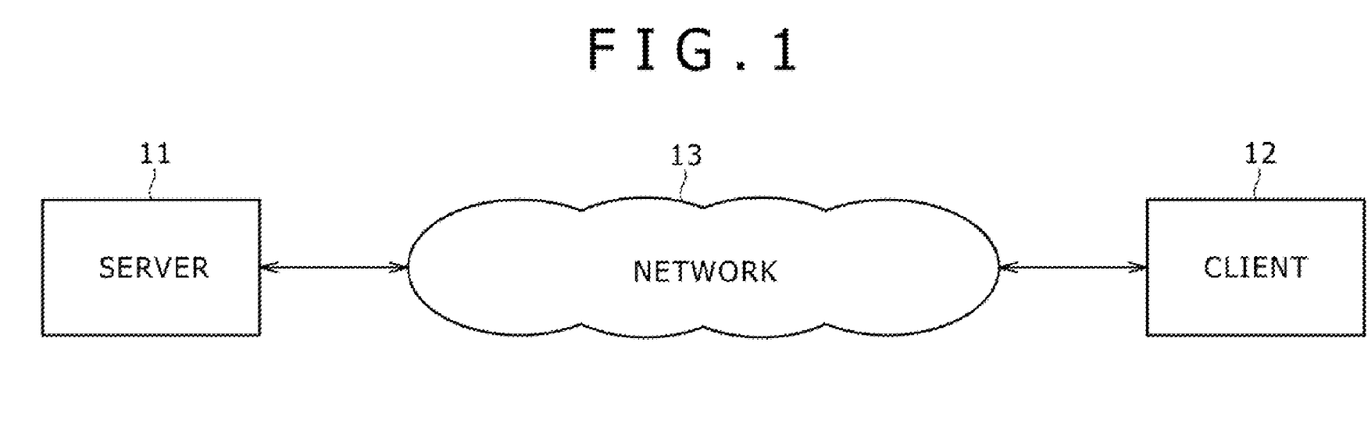
FIG. 1 is a diagram illustrating a server according to one embodiment of the present invention.

FIG. 1 is a diagram illustrating a server 11 according to one embodiment of the present invention. The server 11 is connected to a client 12 via a network 13, and provides a content to the client 12, The server 11 also recommends a content to the client 12 (i.e., a user of the client 12) via the network 13. More specifically, by way of the network 13 such as the Internet or a local area network, the server 11 recommends the content to the user of the client 12 by allowing the client 12 to display a representative image or name of the content on a display screen thereof or by allowing the client 12 to output a tune (i.e., the content), for example.

The term "content" as used herein refers to any type of content item meaningful for the user. Examples of the content include: an image such as a still image, a video image, etc.; sound such as a tune; and numerical data such as a game parameter.

The server 11 is formed by a dedicated server or a personal computer.

Figure 2:
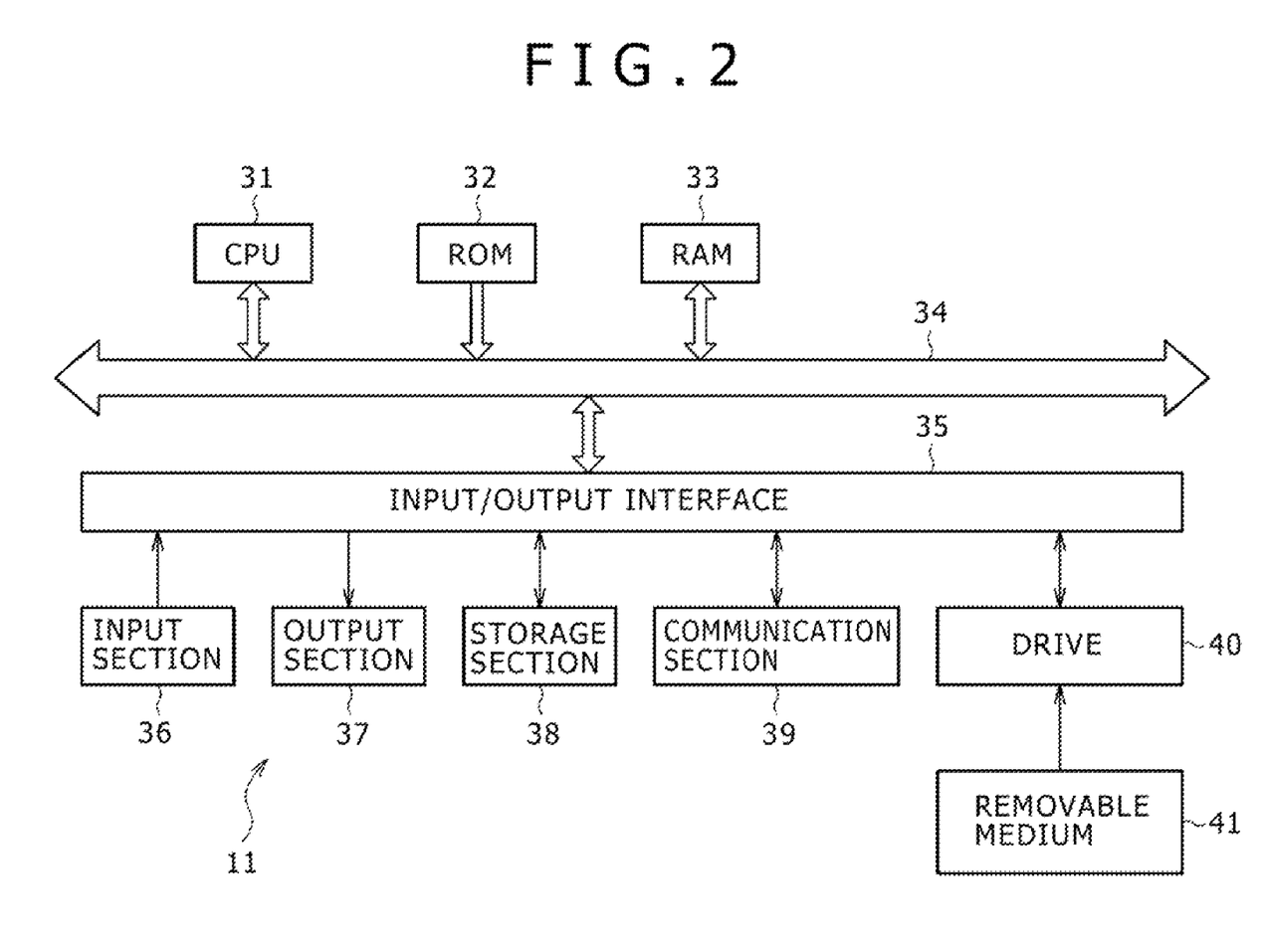
FIG. 2 is a block diagram illustrating an exemplary structure of the server.

FIG. 2 is a block diagram illustrating an exemplary structure of the server 11. A central processing unit (CPU) 31 executes various processes in accordance with a program stored in a read only memory (ROM) 32 or a storage section 38. Data or the program executed by the CPU 31 is stored in a random access memory (RAM) 33 as appropriate. The CPU 31, the ROM 32, and the RAM 33 are connected to one another via a bus 34.

An input/output interface 35 is connected to the CPU 31 via the bus 34. An input section 36 formed by a keyboard, a mouse, etc., and an output section 37 formed by a display, a loudspeaker, etc., are connected to the input/output interface 35. The CPU 31 executes the various processes in accordance with instructions inputted via the input section 36. Then, the CPU 31 outputs results of the processes to the output section 37.

The storage section 38 connected to the input/output interface 35 is formed by a hard disk, for example. The storage section 38 stores the program executed by the CPU 31 and various data. A communication section 39 is used to communicate with an external device, such as the client 12, via the network 13, such as the Internet or the local area network.

The program may be acquired via the communication section 39 and stored in the storage section 38.

When a removable medium 41, such as a magnetic disk, an optical disk, a magneto-optical disk, or a semiconductor memory, is mounted on a drive 40 connected to the input/output interface 35, the drive 40 drives the removable medium 41 to acquire a program or data stored therein. The acquired program or data is transferred to and stored in the storage section 38, as necessary.

FIG. 3 is a block diagram illustrating a structure of a function of the server 11. This function is realized by the CPU 31 that executes the program. The function of the server 11 includes a content database 61, a user database 62, a user profile update section 63, a cache memory 64, a similarity degree calculation section 65, and a recommendation degree calculation section 66.

The content database 61 stores the contents, such as the tune (or the sound), the image (i.e., the video image or the still image), the data meaningful for the user, etc. The content database 61 also stores a content profile of each content.

The content profile indicates a characteristic of the content. For example, the content profile indicates a genre of the content, a keyword concerning the content, etc. For example, the content profile is expressed as a vector with each component representing a separate attribute of the content.

The term "attribute" as used herein refers to a characteristic in which the contents are closely related to one another. Examples of the attribute include the genre of the content, the keyword, and an artist.

Examples of the genre of the content include "rock", "pops", "country", and "jazz". The keyword is a word indicating the contents of the content, and examples of the keyword include "excellent performance", "rare", and "for enthusiasts". The artist indicates, for example, a performer, a writer of lyrics, a composer, an arranger, a producer, or the like.

The user database 62 stores data concerning the user. In other words, the user database 62 stores a user profile indicating a taste of the user of the client 12 concerning the contents.

For example, the user profile indicates the genre of a content which the user likes, a keyword concerning the content which the user likes, or the like. For example, the user profile is expressed as a vector with each component representing a separate attribute. The attributes of the user profile are identical with the attributes of the content profile.

The user is identified by a user ID, which is an identifier (ID) for identifying the user. Each content is identified by a content ID, which is an ID for identifying the content.

The user profile update section 63 updates the user profile. The user profile update section 63 updates the user profile in real time in accordance with viewing of the content, the recording of the content, or the like. Alternatively, the user profile update section 63 may update the user profile by batch processing.

In addition, when the content is provided to the client 12, or the content is searched for by the client 12, or information concerning the content is transmitted to the client 12 in accordance with a request from the user, for example, the user profile update section 63 updates the user profile in accordance with the process performed.

Further, for example, the user profile update section 63 calculates the user profile as the sum of content profiles of contents that have been viewed or listened to or content profiles of contents that have been recorded.

Note that the user profile update section 63 may calculate the user profile while assigning different weights to the content profiles depending on an operation concerning the contents or depending on the contents.

The user profile update section 63 allows the user profile as updated to be stored in the user database 62. In addition, the user profile update section 63 allows a "difference user profile" to be stored in the user database 62. The difference user profile is a difference between the user profile before update and the user profile as updated. The difference user profile is an example of a part of the user profile.

Specific examples of the user profile, the difference user profile, and the content profile will now be described below.

Figure 4:
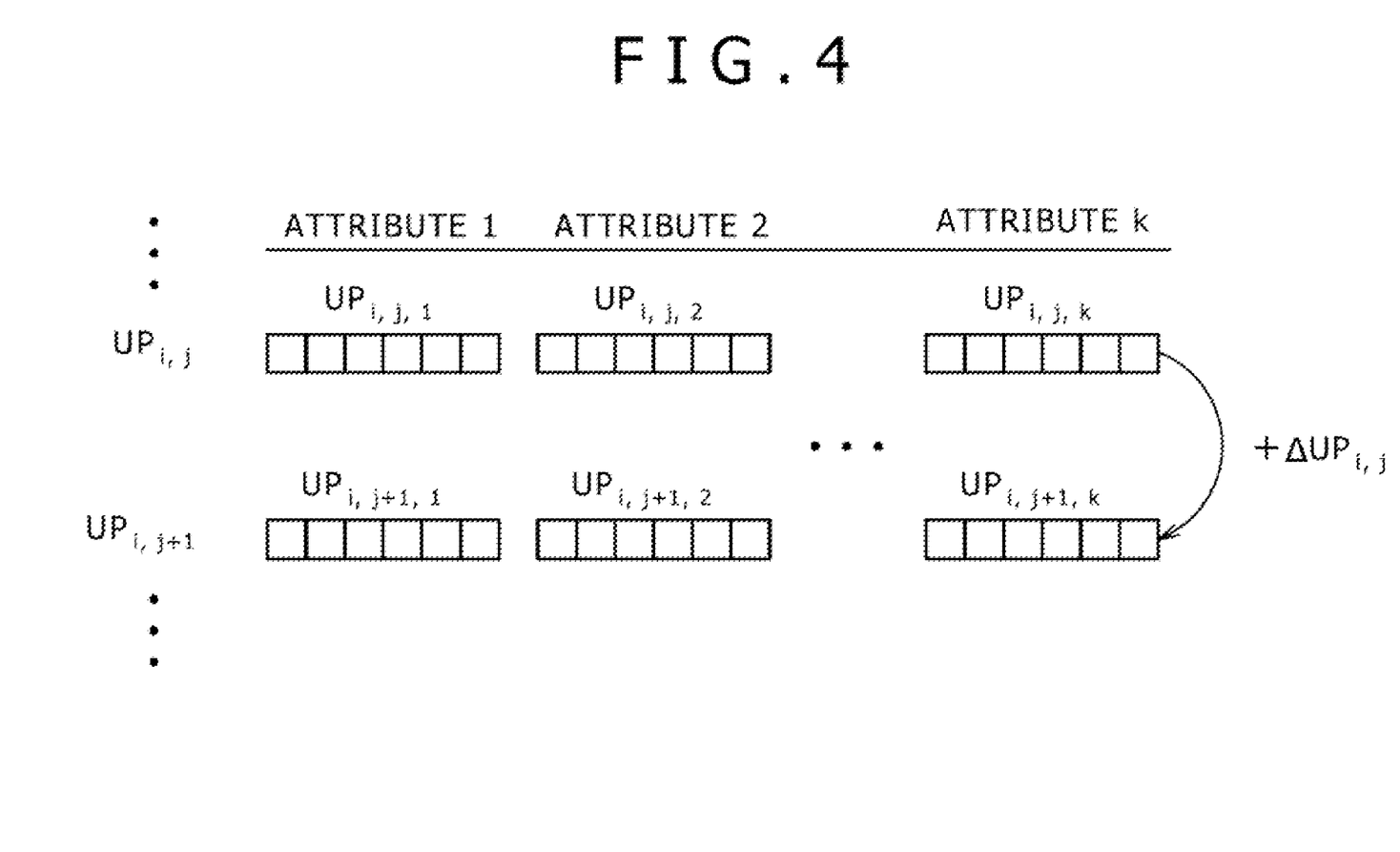
FIG. 4 is a diagram illustrating examples of a user profile and a difference user profile.

FIG. 4 is a diagram illustrating examples of the user profile and the difference user profile.

"User profile $UP_{i,j}$" denotes a profile of a user identified by user ID i at the time of a jth recommendation. "User profile $UP_{i,j+1}$" denotes a profile of the user identified by the user ID i at the time of a (j+1)th recommendation.

For example, content recommendation is carried out when the user profile has been updated. That is, "user profile $UP_{i,j}$" denotes a profile of the user identified by the user ID i at the time when the user profile has been updated the jth time, whereas "user profile $UP_{i,j+1}$" denotes a profile of the user identified by the user ID i at the time when the user profile has been updated the (j+1)th time.

"Difference user profile $\Delta UP_{i,j}$" denotes a difference between the user profile of the user identified by the user ID i at the time of the jth recommendation and the user profile thereof at the time of the (j+1)th recommendation.

The relationships among the user profile $UP_{i,j+1}$, the user profile $UP_{i,j}$, and the difference user profile $\Delta UP_{i,j}$ are expressed by equation (1);

$$UP_{i,j+1} = UP_{i,j} + \Delta UP_{i,j} \qquad (1)$$

"User profile $UP_{i,j,k}$" denotes a part of the user profile $UP_{i,j}$, the part concerning attribute k. For example, "user profile $UP_{i,j,1}$" denotes a part of the user profile $UP_{i,j}$, the part concerning attribute 1, which is the genre of the content. Further, "user profile $UP_{i,j,2}$" denotes a part of the user profile $UP_{i,j}$, the part concerning attribute 2, which is the keyword of the content. Still further, similarly, "user profiles $UP_{i,j,3}$ to $UP_{i,j,k}$" denote parts of the user profile $UP_{i,j}$ the parts concerning attributes 3 to k, respectively.

"User profile $UP_{i,j+1,k}$" denotes a part of the user profile $UP_{i,j+1}$, the part concerning the attribute k. For example, "user profile $UP_{i,j+1,1}$" denotes a part of the user profile $UP_{i,j+1}$ the part concerning the attribute 1, which is the genre of the content. Further, "user profile $UP_{i,j+1,2}$" denotes a part of the user profile $UP_{i,j+1}$, the part concerning the attribute 2, which is the keyword of the content. Still further, similarly, "user profiles $UP_{i,j+1,3}$ to $UP_{i,j+1,k}$" denote parts of the user profile $UP_{i,j+1}$, the parts concerning the attributes 3 to k, respectively.

"Difference user profile $\Delta UP_{i,j,k}$" denotes a part of the difference user profile $\Delta UP_{i,j}$, the part concerning the attribute k. That is, "difference user profile $\Delta UP_{i,j,k}$" denotes a difference between a part of the user profile $UP_{i,j}$ of the user identified by the user ID i at the time of the jth recommendation, the part concerning the attribute k, and a part of the user profile $UP_{i,j+1}$ thereof at the time of the (j+1)th recommendation, the part concerning the attribute k.

The relationships among the user profile $UP_{i,j+1,k}$, the user profile $UP_{i,j,k}$, and the difference user profile $\Delta UP_{i,j,k}$ are expressed by equation (2):

$$UP_{i,j+1,k} = UP_{i,j,k} + \Delta UP_{i,j,k} \qquad (2)$$

Figure 5:
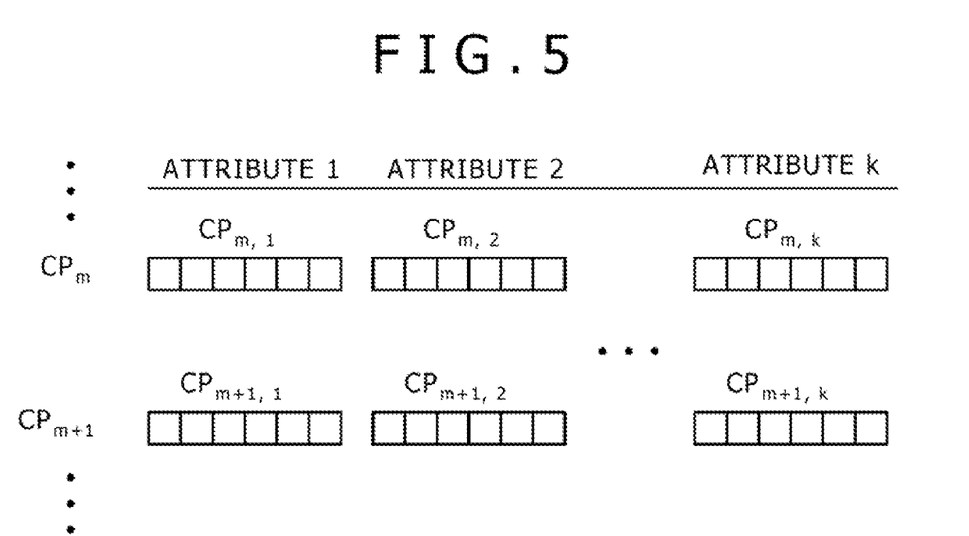
FIG. 5 is a diagram illustrating exemplary content profiles.

FIG. 5 is a diagram illustrating exemplary content profiles.

"Content profile $CP_m$" denotes a profile of a content identified by content ID m, "Content profile $CP_{m+1}$" denotes a profile of a content identified by content ID m+1.

"Content profile $CP_{m,k}$" denotes a part of the content profile $CP_m$, the part concerning the attribute k. For example, "content profile $CP_{m,1}$" denotes a part of the content profile $CP_m$, the part concerning the attribute 1, which is the genre of the content. Further, "content profile $CP_{m,2}$" denotes a part of the content profile $CP_m$, the part concerning the attribute 2, which is the keyword of the content. Still further, similarly, "content profiles $CP_{m,3}$ to $CP_{m,k}$" denote parts of the content, profile $CP_m$, the parts concerning the attributes 3 to k, respectively.

"Content profile $CP_{m+1,k}$" denotes a part of the content profile $CP_{m+1}$, the part concerning the attribute k. For example, "content profile $CP_{m+1,1}$" denotes a part of the content profile $CP_{m+1}$, the part concerning the attribute 1, which is the genre of the content. Further, "content profile $CP_{m+1,2}$" denotes a part of the content profile $CP_{m+1}$, the part concerning the attribute 2, which is the keyword of the content. Still further, similarly, "content profiles $CP_{m+1,3}$ to $CP_{m+1,k}$" denote parts of the content profile $CP_{m+1}$, the parts concerning the attributes 3 to k, respectively.

Note that the attributes 1 to k of the content profile are identical with the attributes 1 to k of the user profile.

Returning to FIG. 3, the cache memory 64 is formed by a part of a storage area of the RAM 33 or the storage section 38 (i.e., the hard disk). The cache memory 64 stores, as a cache, a recommendation degree indicating the degree of recommendation of the content for the user.

Figure 6:
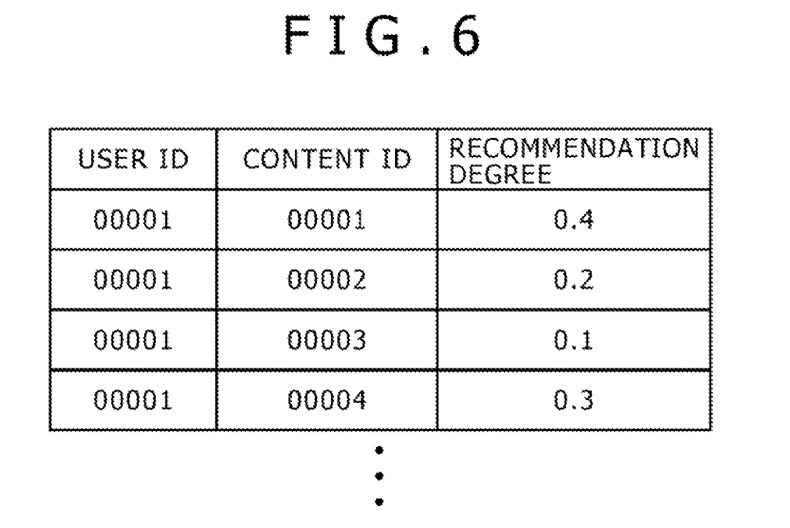
FIG. 6 is a table illustrating exemplary recommendation degrees stored as a cache.

FIG. 6 is a table illustrating exemplary recommendation degrees stored in the cache memory 64 as the cache. The recommendation degrees stored in the cache memory 64 indicate the degree of recommendation of each content for each user. In other wards, each recommendation degree indicates the degree of recommendation of a particular content for a particular user. For example, greater values of the recommendation degree indicate higher degrees of recommendation of the particular content for the particular user.

In the example of FIG. 6, a recommendation degree of a content identified by content ID 00001 for a user identified by user ID 00001 is 0.4; and a recommendation degree of a content identified by content ID 00002 for the user identified by the user ID 00001 is 0.2. Similarly, a recommendation degree of a content identified by content ID 00003 for the user identified by the user ID 00001 is 0.1, and a recommendation degree of a content identified by content ID 00004 for the user identified by the user ID 00001 is 0.3.

In the example of FIG. 6, for the user identified by the user ID 00001, the content identified by the content ID 00001 is recommended the most strongly; the content identified by the content ID 00004 is recommended the second most strongly; the content identified by the content ID 00002 is recommended the third most strongly; and the content identified by the content ID 00003 is recommended the fourth most strongly.

Returning to FIG. 3, the similarity degree calculation section 65 calculates a similarity degree that, indicates the degree of similarity between a characteristic of the taste of the user and a characteristic of the content.

For example, the similarity degree calculation section 65 calculates an inner product or cosine measure of the user profile with the content profile as the degree of similarity (i.e., the similarity degree) between the user profile and the content profile. The similarity degree calculation section 65 calculates similarity degree $Sim_{i,j,k,m}$ concerning the attribute k by using equation (3):

$$Sim_{i,j,k,m} = UP_{i,j,k} \cdot CP_{m,k} \qquad (3)$$

where the operator "·" is an operator for calculating the similarity degree, such as the inner product or the cosine measure. Hereinafter, the operator "·" indicates an operation of calculating the similarity degree.

In addition, the similarity degree calculation section 65 calculates the degree of similarity between a part of the user profile (i.e., the profile of the user) as updated and the content profile (i.e., the profile of the content).

The similarity degree calculation section 65 supplies the calculated similarity degree to the recommendation degree calculation section 66.

Based on the similarity degree, the recommendation degree calculation section 66 calculates the recommendation degree, which indicates the degree of recommendation of the content for the user.

In general, the recommendation degree is calculated by multiplying the similarity degrees calculated on an attribute-by-attribute basis by coefficients (i.e., assigning different weights to the attributes), and doing the sum of the similarity degrees concerning the respective attributes multiplied by the coefficients. Assuming that a coefficient (i.e., a weight) for the attribute k is denoted by $b_k$, recommendation degree $Rec_{i,j,m}$ of the content identified by the content ID m for the user identified by the user ID i at the time of the jth recommendation is calculated by an operation represented by equation (4);

$$Rec_{i,j,m} = \Sigma_{k=0}((UP_{i,j,k} \cdot CP_{m,k}) \times b_k) \qquad (4)$$

Note that the coefficient $b_k$ is determined beforehand.

The recommendation degree calculation section 66 calculates the amount of variation of the recommendation degree of the content for the user based on the similarity degree calculated by the similarity degree calculation section 65, and adds the calculated amount of the variation of the recommendation degree to the recommendation degree stored in the cache memory 64, thereby calculating a new recommendation degree.

The recommendation degree calculation section 66 allows the calculated new recommendation degree to be stored in the cache memory 64.

The similarity degree calculation section 65 includes a difference similarity degree variation calculation section 81, an attribute part similarity degree variation calculation section 82, and a difference attribute part similarity degree variation calculation section 83.

The difference similarity degree variation calculation section 81 calculates the degree of similarity between the difference user profile, which is the difference between the user profile before update and the user profile as updated, and the content profile.

The attribute part similarity degree variation calculation section 82 calculates the degree of similarity between a part of the user profile, the part corresponding to a specific attribute, and the content profile. Specifically, for example, the attribute part similarity degree variation calculation section 82 calculates such a degree of similarity with respect to a plurality of parts of the user profile as updated sequentially, each of the plurality of parts corresponding to a separate group of attributes into which the attributes of the user profile are classified.

The difference attribute part similarity degree variation calculation section 83 calculates the degree of similarity between a part of the difference user profile, the part correspond to a specific attribute, and the content profile.

The recommendation degree calculation section 66 includes a difference recommendation degree variation calculation section 84, a difference recommendation degree variation adding section 85, an attribute part recommendation degree variation calculation section 86, an attribute part recommendation degree variation adding section 87, a difference attribute part recommendation degree variation calculation section 88, and a difference attribute part recommendation degree variation adding section 89.

Based on the degree of similarity between the difference user profile and the content profile calculated by the difference similarity degree variation calculation section 81, the difference recommendation degree variation calculation section 84 calculates the amount of variation of the recommendation degree corresponding to the calculated degree of similarity.

The difference recommendation degree variation adding section 85 adds the amount of the variation of the recommendation degree calculated by the difference recommendation degree variation calculation section 84 to the recommendation degree stored in the cache memory 64, thereby calculating a new recommendation degree.

Based on the degree of similarity between the part of the user profile corresponding to the specific attribute and the content profile calculated by the attribute part similarity degree variation calculation section 82, the attribute part recommendation degree variation calculation section 86 calculates the amount of variation of the recommendation degree corresponding to the calculated degree of similarity.

The attribute part recommendation degree variation adding section 87 adds the amount of the variation of the recommendation degree calculated by the attribute part recommendation degree variation calculation section 86 to the recommendation degree stored in the cache memory 64, thereby calculating a new recommendation degree.

Based on the degree of similarity between the part of the difference user profile corresponding to the specific attribute and the content profile calculated by the difference attribute part similarity degree variation calculation section 83, the difference attribute part recommendation degree variation, calculation section 88 calculates the amount of variation of the recommendation degree corresponding to the calculated degree of similarity.

The difference attribute part recommendation degree variation adding section 89 adds the amount of the variation of the recommendation degree calculated by the difference attribute part recommendation degree variation calculation section 88 to the recommendation degree stored in the cache memory 64, thereby calculating a new recommendation degree.

Next, referring to a flowchart of FIG. 7, a procedure of calculating a (j+1)th recommendation degree using the difference user profile will now be described below.

At step S11, the difference similarity degree variation calculation section 81 within the similarity degree calculation section 65 loads, from the user database 62, the user profile $UP_{i,j}$ and the difference user profile $\Delta UP_{i,j}$ concerning the user identified by the user ID i.

Note that, an step S11, the difference similarity degree variation calculation section 81 may calculate the user profile $UP_{i,j}$ by loading the user profile $UP_{i,j+1}$ and the difference user profile $\Delta UP_{i,j}$ from the user database 62 and subtracting the difference user profile $\Delta UP_{i,j}$ from the user profile $UP_{i,j+1}$.

At step S12, the difference similarity degree variation calculation section 81 determines, based on a result of the process of step S11, whether or not either the user profile $UP_{i,j}$ or the difference user profile $\Delta UP_{i,j}$ exists. If it is determined at step S12 that either the user profile $UP_{i,j}$ or the difference user profile $\Delta UP_{i,j}$ exists, control, proceeds to step S13. At step S13, the difference similarity degree variation calculation section 81 loads, from the cache memory 64, the recommendation degree cached therein.

At step S14, the difference similarity degree variation calculation section 81 loads, from the content database 61, the content profile $CP_m$ of the content identified by the content ID m. Note that in a first iteration of the process of step S14, the difference similarity degree variation calculation section 81 loads content profile $CP_0$, i.e., a content profile of a content identified by content ID 0.

At step S15, the difference similarity degree variation calculation section 81 determines, based on a result of the process of step S14, whether the content profile $CP_m$ exists. If it is determined at step S15 that the content profile $CP_m$ exists, control proceeds to step S16. At step S16, the difference similarity degree variation calculation section 81 checks whether the recommendation degree of the content identified by the content ID m for the user identified by the user ID i has been cached. That is, at step S16, the difference similarity degree variation calculation section 81 checks whether the recommendation degree loaded in the process of step S13 contains the recommendation degree of the content identified by the content ID m for the user identified by the user ID i.

At step S17, the difference similarity degree variation calculation section 81 determines, based on a result of the process of step S16, whether the recommendation degree of the content identified by the content ID m for the user identified by the user ID i exists in a cache therein.

If it is determined at step S17 that, the recommendation degree of the content identified by the content ID m for the user identified by the user ID i exists in the cache, which means that a jth recommendation degree of that content for that user has already been calculated and exists in the cache, control proceeds to step S18. At step S18, the difference similarity degree variation calculation section 81 calculates the degree of similarity between the difference user profile $\Delta UP_{i,j}$ and the content profile $CP_m$ with respect to each attribute. Then, control proceeds to step S20.

Meanwhile, if it is determined at step S17 that the recommendation degree of the content identified by the content ID m for the user identified by the user ID i does not exist in the cache, which means that the recommendation degree of that content for that user has never been calculated, control proceeds to step S19. At step S19, the similarity degree calculation section 65 calculates the degree of similarity between the user profile $UP_{i,j+1}$ and the content profile $CP_m$ with respect to each attribute. Then, control proceeds to step S20. Note that the user profile $UP_{i,j+1}$ is calculated by adding the user profile $UP_{i,j}$ and the difference user profile $\Delta UP_{i,j}$ together according to the above equation (1), for example.

At step S20, based on the degree of similarity calculated at step S18 or the degree of similarity calculated at step S19, the difference recommendation degree variation calculation section 84 within the recommendation degree calculation section 66 calculates the recommendation degree of the content identified by the content ID m for the user identified by the user ID i.

At step S21, the difference recommendation degree variation adding section 85 within the recommendation degree calculation section 66 adds the recommendation degree calculated at step S20 to the recommendation degree in the cache.

The recommendation degree $Rec_{i,j,m}$ at the time of the jth recommendation is calculated by using equation (4):

$$Rec_{i,j,m} = \Sigma_{k=0}((UP_{i,j,k} \cdot CP_{m,k}) \times b_k).$$

Recommendation degree $Rec_{i,j+1,m}$ at the time of the (j+1)th recommendation is calculated by using equation (5):

$$Rec_{i,j+1,m} = Rec_{i,j,m} + \Sigma_{k=0}((\Delta UP_{i,j,k} \cdot CP_{m,k}) \times b_k) \quad (5)$$

where $\Sigma_{y=0} y(x)$ denotes the sum of a series starting with an sth term of $y(x)$ and ending with (((the total number of attributes)−1)th term of $y(x)$.

Specifically, at step S18, the difference similarity degree variation calculation section 81 calculates the degree of similarity, $\Delta UP_{i,j,k} \cdot CP_{m,k}$, between the difference user profile $\Delta UP_{i,j}$ and the content profile $CP_m$ with respect to each attribute. In the case where the process of step S18 has been performed instead of the process of step S19, the difference recommendation degree variation calculation section 84 calculates, at step S20, the recommendation degree, $\Sigma_{k=0}((\Delta UP_{i,j,k} \cdot CP_{m,k}) \times b_k)$, of the content identified by the content ID m for the user identified by the user ID i. That is, the difference recommendation degree variation calculation section 84 calculates the amount of the variation of the recommendation degree, $\Sigma_{k=0}((\Delta UP_{i,j,k} \cdot CP_{m,k}) \times b_k)$, corresponding to the degree of similarity, $\Delta UP_{i,j,k} \cdot CP_{m,k}$, with respect to each attribute.

In the case where the process of step S18 has been performed instead, of the process of step S19, the difference recommendation degree variation adding section 85, at step S21, adds $\Sigma_{k=0}((\Delta UP_{i,j,k} \cdot CP_{m,k}) \times b_k)$ calculated at step S20 to the recommendation degree $Rec_{i,j,m}$ in the cache, thereby calculating the recommendation degree $Rec_{i,j+1,m}$ as shown in the above equation (5).

Here, to compare the sire of the user profile $UP_{i,j,k}$ with that of the difference user profile $\Delta UP_{i,j,k}$, the difference user profile $\Delta UP_{i,j,k}$ is much smaller in size than the user profile $UP_{i,j,k}$. Therefore, using the difference user profile $\Delta UP_{i,j,k}$ for the calculation of the recommendation degree results in reduction in computation amount.

Meanwhile, at step S19, the similarity degree calculation section 65 calculates the degree of similarity, $UP_{i,j+1,k} \cdot CP_{m,k}$, between the user profile $UP_{i,j+1,k}$ and the content profile $CP_{m,k}$ with respect to each attribute. In the case where the process of step S19 has been performed instead of the process of step S18, the difference recommendation degree variation calculation section 84 calculates, at step S20, the recommendation degree, $\Sigma_{k=0}((UP_{i,j+1,k} \cdot CP_{m,k}) \times b_k)$, of the content identified by the content ID m for the user identified by the user ID i.

In the case where the process of step S19 has been performed instead of the process of step S18, which means that the recommendation degree of the content identified by the content ID m for the user identified by the user ID i does not exist in the cache, at step S20, the recommendation degree, $\Sigma_{k=0}((UP_{i,j+1,k} \cdot CP_{m,k}) \times b_k)$, calculated at step S20 is added to a null value of the recommendation degree. That is, $\Sigma_{k=0}((UP_{i,j+1,k} \cdot CP_{m,k}) \times b_x)$ as it is determined to be the recommendation degree.

At step S22, the difference recommendation degree variation adding section 85 stores the new recommendation degree obtained by the addition in the cache memory 64.

At step S23, the difference similarity degree variation calculation section 81 within the similarity degree calculation section 65 increments m by 1. Then, control returns to step S14 to repeat the process described above.

If it is determined at step S15 that the content profile $CP_m$ does not exist, which means that the calculation of the recommendation degree has been, completed with respect to all contents, control proceeds to step S24. At step S24, the recommendation degree calculation section 66 outputs the new recommendation degree calculated. Then, this procedure is completed.

If it is determined at step S12 that neither the user profile $UP_{i,j}$ nor the difference user profile $\Delta UP_{i,j}$ exists, which means that the calculation of the recommendation degree is impossible, control proceeds to step S25. At step S25, the recommendation degree calculation section 66 outputs "No Result". Then, this procedure is completed.

As described above, the reduction in computation amount required for the calculation of the recommendation degree is achieved, and it is possible to carry out the content recommendation speedily while maintaining the precision of recommendation at a high level.

Next, referring to a flowchart of FIG. 8, a procedure of calculating the (j+1)th recommendation degree using the part of the user profile corresponding to the specific attribute will now be described below.

At step S41, the attribute part similarity degree variation calculation section 82 checks the value of (j+1). Note that the value of j corresponds to the number of times the recommendation has been performed so far. Specifically, for example, at step S41, the attribute part similarity degree variation calculation section 82 reads the value of (j+1) stored as a variable.

Here, it is assumed that the attributes of the user profile are classified into a predetermined number of groups, for example. At step S42, the attribute part similarity degree variation calculation section 82 determines whether the value of (j+1) is greater than the number of group's of the attributes.

If it is determined at step S42 that the value of (j+1) is equal to or less than the number of groups of the attributes, which means that the user profile $UP_{i,j+1}$ has a part that has not yet been used for the calculation of the recommendation degree, control proceeds to step S43. At step S43, the attribute part similarity degree variation calculation section 82 loads, from the user database 62, a necessary part of the user profile $UP_{i,j+1}$ concerning the user identified by the user ID i, the necessary part corresponding to the specific attribute k. That is, at step S43, the attribute part similarity degree variation calculation section 82 loads, from the user database 62, the user profile $UP_{i,j+1,k}$. The user profile $UP_{i,j+1,k}$ is a part of the user profile $UP_{i,j+1}$ concerning the user identified by the user ID i, the part corresponding to the attribute k with respect to which the next recommendation degree is calculated.

At step S44, the attribute part similarity degree variation calculation section 82 loads, from the cache memory 64, the recommendation degree cached therein.

At step S45, the attribute part similarity degree variation calculation section 82 loads, from the content database 61, a part of the content profile $CP_m$ of the content identified by the content ID m, the part corresponding to the attribute k. That is, the attribute part similarity degree variation calculation section 82 loads the content profile $CP_{m,k}$. Note that for each iteration of the process of step S45, the value of m is incremented by one, as will be described below.

At step S46, based on a result of the process of step S45, the attribute part similarity degree variation calculation section 82 determines whether the content profile $CP_{m,k}$ exists. If it is determined at step S46 that the content profile $CP_{m,k}$ exists, control proceeds to step S47. At step S47, the attribute part similarity degree variation calculation section 82 calculates the degree of similarity between the user profile $UP_{i,j+1,k}$ and the content profile $CP_{m,k}$.

At step S48, the attribute part recommendation degree variation calculation section 86 within the recommendation degree calculation section 66 calculates the amount of variation of the recommendation degree of the content based on the degree of similarity calculated at step S47.

At step S49, the attribute part recommendation degree variation adding section 87 within the recommendation degree calculation section 66 adds the amount of the variation of the recommendation degree of the content calculated at step S48 to the cached recommendation degree.

Suppose that the user profile $UP_{i,j+1}$ is divided into two parts: a group consisting of user profile $UP_{i,j+1,0}$, the user profile $UP_{i,j+1,1}$, and the user profile $UP_{i,j+1,2}$; and a group consisting of user profile $UP_{i,j+1,3}$, user profile $UP_{i,j+1,4}$, and user profile $UP_{i,j+1,5}$. Also suppose that the recommendation degree $Rec_{i,j,m}$ at the time of the jth recommendation has been calculated by using equation (6):

$$Rec_{i,j,m} = \Sigma_{k=0,2}((UP_{i,j,k} \cdot CP_{m,k}) \times b_k) \quad (6)$$

Note that $UP_{i,j,k} = \Sigma_{k=0,5} UP_{i,j,k}$.

In this case, the recommendation degree $Rec_{i,j+1,m}$ at the time of the (+1)th recommendation is calculated by using equation (7):

$$Rec_{i,j+1,m} = Rec_{i,j,m} + \Sigma_{k=3,5}((UP_{i,j+1,k} \cdot CP_{m,k}) \times b_x) \quad (7)$$

Here, the degrees of contribution of $\Sigma_{k=0,2} UP_{i,j,k}$ and $\Sigma_{3,5} UP_{i,j,k}$ to the precision of the recommendation degree are compared with each other, and selection and classification of the attributes are performed so that the degree of contribution of $\Sigma_{k=0,2} UP_{i,j,k}$ is greater than that of $\Sigma_{k=3,5} UP_{i,j,k}$.

Note that the number of groups into which the user profile $UP_{i,j+1,k}$ is divided may be greater than two. Also note that the division of the user profile $UP_{i,j+1,k}$ need not be performed based on the attributes. For example, it may be so arranged that elements of the user profile be arranged in descending order of the degree of contribution to the precision of the recommendation degree, and that the elements be classified into a predetermined number (e.g., three) of groups.

At step S50, the attribute part recommendation degree variation adding section 87 stores the new recommendation degree calculated by the addition in the cache memory 64.

At step S51, the attribute part similarity degree variation calculation section 82 increments m by 1. Then, control returns to step S45.

If it is determined at step S46 that the content profile $CP_{m,k}$ does not exist, which means that the calculation of the recommendation degree has been completed with respect to all contents, control proceeds to step S52. At step S52, the recommendation degree calculation section 66 outputs the new recommendation degree calculated. Then, this procedure is completed.

If it is determined at step S42 that the value of (j+1) is greater than the number of groups, which means that the whole of the user profile $UP_{i,j+1}$ has been used for the calculation of the recommendation degree, control proceeds to step S53. At step S53, the recommendation degree calculation section 66 loads, from the cache memory 64, the recommendation degree cached therein. Then, control proceeds to step S54. At step S54, the recommendation degree calculation section 66 outputs the loaded recommendation degree. Then, this procedure is completed.

Figure 8:
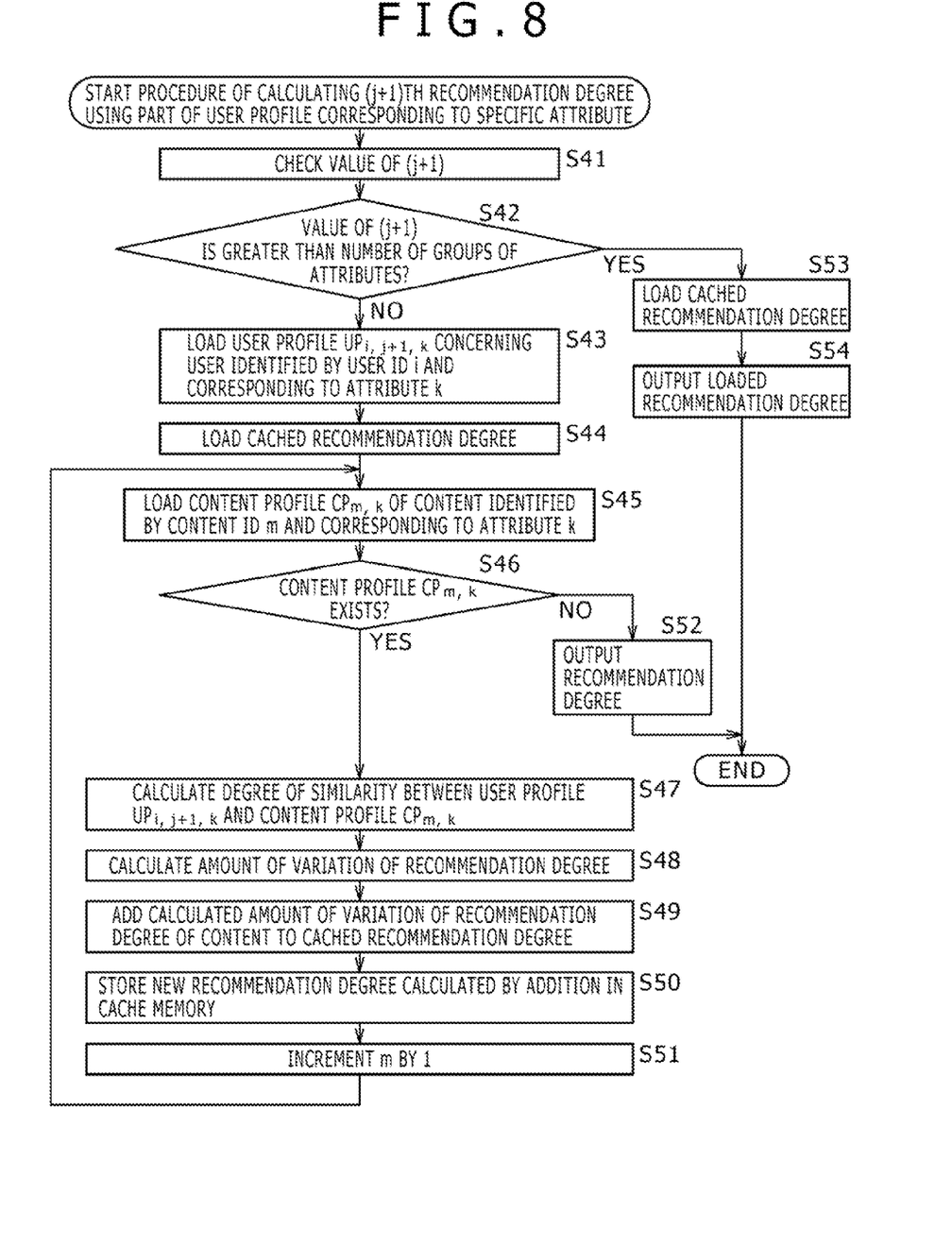
FIG. 8 is a flowchart: illustrating a procedure of calculating the (j+1)th recommendation degree using a part of the user profile corresponding a specific attribute.

In the procedure of the calculation of the recommendation degree illustrated by the flowchart of FIG. 8, the user profile $UP_{i,j,k}$ obtained by dividing the user profile $UP_{i,j,k}$ based on the attributes is used for the calculation of the similarity degree. Since the user profile $UP_{i,j,k}$ used in one iteration of the calculation of the similarity degree has a reduced size, a reduction in the computation amount is achieved and it is possible to carry out the recommendation of the content more speedily.

Note that the number of groups into which the attributes of the user profile are classified may be varied dynamically. For example, in the case where the size of the user profile is smaller than a predetermined threshold value, the number of groups into which the attributes of the user profile are classified may be set at a smaller value, or the whole of the user profile may be used for the calculation of the recommendation degree without dividing the user profile. This serves to prevent an excessive reduction in the precision of the recommendation.

More specifically, the number of groups may be determined in accordance with the size of the user profile such that as the size of the user profile (expressed as the vector) increases, the number of groups decreases. In addition, a threshold value with which the size of the user profile is compared may be predetermined so that any user profile whose size is equal to or less than the predetermined threshold value is determined not to be divided into groups.

Suppose that the contents are sorted by the recommendation degree so that the contents are arranged in descending order of the recommendation degree, and that the content to be recommended is determined based on this arrangement. Also suppose that attributes having higher degrees of contribution to the precision of the recommendation degree are selected earlier for the calculation of the recommendation degree than those with lower contribution degrees. In this case, because it is unlikely that a content whose recommendation degree calculated so far is low will eventually rank high in the above arrangement, any content that has a recommendation degree lower than a predetermined threshold value may be excluded from an object of the calculation of the next similarity degree. This further reduces the computation amount.

Figure 9:
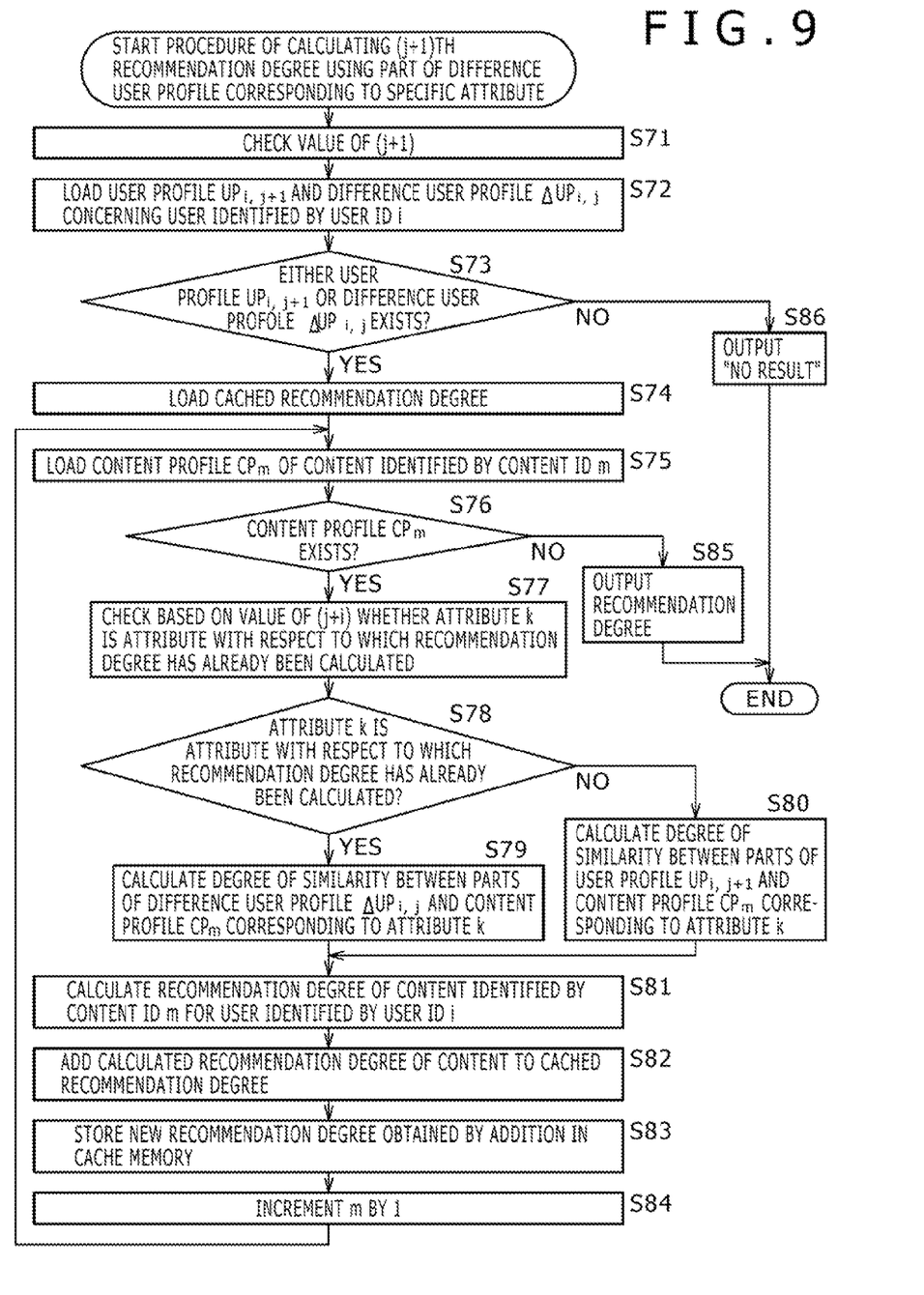
FIG. 9 is a flowchart illustrating a procedure of calculating the (j+1)th recommendation degree using a part of the difference user profile corresponding to a specific attribute.

Next, referring to a flowchart of FIG. 9, a procedure of calculating the (j+1)th recommendation degree using the part of the difference user profile corresponding to the specific attribute will now be described below.

At step S71, the difference attribute part similarity degree variation calculation section 83 within the similarity degree calculation section 65 checks the value of (j+1) to identify the specific attribute k with respect to which the calculation of the recommendation degree is performed. At step S72, the difference attribute part similarity degree variation calculation section 83 loads, from the user database 62, the user profile $UP_{i,j+1}$ and the difference user profile $\Delta UP_{i,j}$ concerning the user identified by the user ID i.

Note that, at step S72, the difference attribute part similarity degree variation calculation section 83 may alternatively load, from the user database 62, the user profile $UP_{i,j}$ and the difference user profile $\Delta UP_{i,j}$ and calculate the user profile $UP_{i,j+1}$ by adding the user profile $UP_{i,j}$ and the difference user profile $\Delta UP_{i,j}$ together.

At step S73, based on a result of the process of step S72, the difference attribute part similarity degree variation calculation section 83 determines whether or not either the user profile $UP_{i,j+1}$ or the difference user profile $\Delta UP_{i,j}$ exists. If it is determined at step S73 that either the user profile $UP_{i,j+1}$ or the difference user-profile $\Delta UP_{i,j}$ exists, control proceeds to step S74. At step S74, the difference attribute part similarity degree variation calculation section 83 loads, from the cache memory 64, the recommendation degree cached therein.

At step S75, the difference attribute part similarity degree variation calculation section 83 loads, from the content database 61, the content profile $CP_m$ of the content identified by the content ID m. Note that in a first iteration of the process of step S75, the difference attribute part similarity degree variation calculation section 83 loads the content profile $CP_0$, i.e., the content profile of the content identified by the content ID 0.

At step S76, based on a result of the process of step S75, the difference attribute part similarity degree variation calculation section 83 determines whether the content profile $CP_m$ exists. If it is determined at step S76 that the content profile $CP_m$ exists, control proceeds to step S77. At step S77, based on the value of (j+1), the difference attribute part similarity degree variation calculation section 83 checks whether the specific attribute k is an attribute with respect to which the recommendation degree has already been calculated.

At step S78, based on a result of the process of step S77, the difference attribute part similarity degree variation calculation section 83 determines whether the attribute k is an attribute with respect to which the recommendation degree has already been calculated. If it is determined at step S78 that the attribute k is an attribute with respect to which the recommendation degree has already been calculated, control proceeds to step S79. At step S79, the difference attribute part similarity degree variation calculation section 83 calculates the degree of similarity between parts of the difference user profile $\Delta UP_{i,j}$ and the content profile $CP_m$ corresponding to the attribute k. Then, control proceeds to step S81.

If it is determined at step S78 that the attribute k is not an attribute with respect to which the recommendation degree has already been calculated, control proceeds to step S80. At step S80, the similarity degree calculation section 65 calculates the degree of similarity between parts of the user profile $UP_{i,j+1}$ and the content profile $CP_m$ corresponding to the attribute k. Then, control proceeds to step S81.

At step S81, based on the degree of similarity calculated at step S79 or the degree of similarity calculated at step S80, the difference attribute part recommendation degree variation calculation section 88 within the recommendation degree calculation section 66 calculates the recommendation degree of the content identified by the content ID m for the user identified by the user ID i.

At step S81, the difference attribute part recommendation degree variation adding section 89 within the recommendation degree calculation section 66 adds the recommendation degree of the content calculated at step S81 to the cached recommendation degree.

Suppose that the user profile $UP_{i,j+1,k}$ is divided into two parts: the group consisting of the user profile $UP_{i,j+1,0}$, the user profile $UP_{i,j+1,1}$ and the user profile $UP_{i,j+1,2}$; and the group consisting of the user profile $UP_{i,j+1,3}$ the user profile $UP_{i,j+1,4}$, and the user profile $UP_{i,j+1,5}$. Also suppose that the recommendation degree $Rec_{i,j,m}$ at the time of the jth recommendation has been calculated by using the aforementioned equation (6).

In this case, the recommendation degree $Rec_{i,j+1,m}$ at the time of the (j+1)th recommendation is calculated by using equation (8);

$$Rec_{i,j+1,m} = Rec_{i,j,m} + \Sigma_{k=0,2}((\Delta UP_{i,j,k} \cdot CP_{m,k}) \times b_k) + \Sigma_{k=3,5}((UP_{i,j+1,k} \cdot CP_{m,k}) \times b_k) \quad (8)$$

Specifically, in the case where it has been determined, at step S78 that the attribute k is an attribute with respect to which the recommendation degree has already been calculated, the difference attribute part recommendation degree variation calculation section 88 calculates, at step S79, the similarity degree $\Delta UP_{i,j,k} \cdot CP_{m,k}$ with respect to each of the attributes 0 to 2. Then, at step S81, the difference attribute part recommendation degree variation calculation section 88 calculates the recommendation degree of the content, $\Sigma_{k=0,2}((\Delta UP_{i,j,k} \cdot CP_{m,k}) \times b_s)$; and at step S82, the difference attribute part recommendation degree variation adding section 89 adds $\Sigma_{k=0,2}((\Delta UP_{i,j,k} \cdot CP_{m,k}) \times b_k)$ to the recommendation, degree $Rec_{i,j,m}$ to calculate $Rec_{i,j,m} + \Sigma_{k=0,2}((\Delta UP_{i,j,k} \cdot CP_{m,k}) \times b_k)$ as the (j+1)th recommendation degree $Rec_{i,j+1,m}$.

Meanwhile, in the case where it has been determined at step S78 that the attribute k is not an attribute with respect to which the recommendation degree has already been calculated, the similarity degree calculation section 65 calculates, at step S80, the similarity degree $UP_{i,j+1,k} \cdot CP_{m,k}$ with respect to each of the attributes 3 to 5. Then, at step S81, the difference attribute part recommendation degree variation calculation section 88 calculates the recommendation degree of the content, $\Sigma_{k=3,5}((UP_{i,j+1,k} \cdot CP_{m,k}) \times b_k)$; and at step S82, the difference attribute part, recommendation degree variation, adding section 89 adds $\Sigma_{k=3,5}((UP_{i,j+1,k} \cdot CP_{m,k}) \times b_k)$ to the recommendation degree $Rec_{i,j,m}$ to calculate $Rec_{i,j,m} + \Sigma_{k=3,5}((UP_{i,j+1,k} \cdot CP_{m,k}) \times b_k)$ as the (j+1)th recommendation degree $Rec_{i,j+1,m}$.

Thus, an additional reduction, in the computation amount required for the calculation of the recommendation degree is achieved. This makes it possible to carry out the content recommendation more speedily while maintaining the precision of recommendation at a high level to some extent.

At step S83, the difference attribute part recommendation degree variation adding section 89 stores the new recommendation degree obtained by the addition in the cache memory 64.

At step S84, the difference attribute part similarity degree variation calculation section 83 within the similarity degree calculation section 65 increments m by 1. Then, control returns to step S75.

If it is determined at step S76 that the content profile $CP_m$ does not exist, which means that the calculation of the recommendation degree has been completed with respect to all contents, control proceeds to step S85. At step S85, the recommendation degree calculation section 66 outputs the new recommendation degree calculated. Then, this procedure is completed.

If it is determined at step S73 that neither the user profile $UP_{i,j+1}$ nor the difference user profile $\Delta UP_{i,j}$ exists, which means that the calculation of the recommendation degree is impossible, control proceeds to step S86. At step S86, the recommendation degree calculation section 66 outputs "No Result". Then, this procedure is completed.

As described above, in the case where the degree of similarity between the user profile and the content profile is calculated and then, based on this degree of similarity, the recommendation degree of the content is calculated, it is possible to recommend the content which the user likes. In addition, in the case where the recommendation degree indicating the degree of recommendation of the content for the user is stored, then the degree of similarity between a part of the user profile (i.e., the profile of the user) as updated and the content profile (i.e., the profile of the content) is calculated, then based on the calculated degree of similarity, the amount of the variation of the recommendation degree of the content for the user is calculated, and then the calculated amount of the variation of the recommendation degree is added to the stored recommendation degree to calculate the new recommendation degree, it is possible to carry out the content recommendation speedily while maintaining the precision of recommendation at a high level.

Note that the above-described series of processes may be implemented either by hardware or by software. In the case where the series of processes are implemented by software, a program that constitutes the software and which is stored in a program storage medium is installed into a dedicated computer or, for example, a general-purpose personal computer that, when various programs are installed therein, becomes capable of performing various functions.

The program storage medium that stores the program to be installed into the computer so as to be executable by the computer is, as illustrated in FIG. 2, constituted by the removable medium 41, the ROM 32 for temporary or permanent storage of the program, the hard disk that forms the storage section 38, or the like. The removable medium 41 is a packaged medium, and examples of the removable medium 41 include a magnetic disk (including a flexible disk), an optical disk (including a CD-ROM (Compact Disc-Read Only Memory) and a DVD (Digital Versatile Disc)), a magneto-optical disk, and a semiconductor memory. The storage of the program into such a program storage medium is achieved as necessary via the communication section 39, which is an interface for a router, a modem, or the like, employing a wired or wireless communication medium such as the local area network, the Internet, or digital satellite broadcasting.

Note that the steps implemented by the program stored in the program storage medium and described in the present specification may naturally be performed chronologically in order of description but need not be performed chronologically. Some steps may be performed in parallel or independently of one another.

It should be understood by those skilled in the art that various modifications, combinations, sub-combinations and alterations may occur depending on design requirements and other factors insofar as they are within the scope of the appended claims or the equivalents there of.

What is claimed is:

1. An information processing apparatus, comprising:
   storing means for storing a previously calculated recommendation degree that indicates a degree to which a content is recommended for a user, the previously calculated recommendation degree being based on an existing user profile for the user and a content profile for the content;
   similarity degree calculation means for calculating, based on an update to an attribute of the user profile, a degree of similarity between the updated attribute of the user profile and a corresponding attribute of the content profile;
   recommendation degree variation calculation means for calculating, based on the degree of similarity, an amount of variation of the previously calculated recommendation degree due to the update to the attribute of the user profile; and
   recommendation degree calculation means for calculating an updated recommendation degree by adding the amount of variation due to the update to the attribute of the user profile to the previously calculated recommendation degree.

2. The information processing apparatus according to claim 1, wherein the updated attribute of the user profile is also an attribute of the content.

3. The information processing apparatus according to claim 2, wherein said similarity degree calculation means calculates a plurality of degrees of similarity between a plurality of attributes of the user profile and a plurality of corresponding attributes of the content.

4. An information processing method, comprising the steps implemented by a computer of:
   storing, in a storage device, a previously calculated recommendation degree that indicates a degree to which a content is recommended for a user, the previously calculated recommendation degree being based on an existing user profile for the user and a content profile for the content;
   calculating, based on an update to an attribute of the user profile, a degree of similarity between the updated attribute of the user profile and a corresponding attribute of the content profile;
   calculating, based on the degree of similarity, an amount of variation of the previously calculated recommendation degree due to the update to the attribute of the user profile; and
   calculating an updated recommendation degree by adding the amount of variation due to the update to the attribute of the user profile to the previously calculated recommendation degree.

5. A computer-readable storage medium storing instructions for causing a computer to perform a method comprising:
   storing a previously calculated recommendation degree that indicates a degree to which a content is recommended for a user, the previously calculated recommendation degree being based on an existing user profile for the user and a content profile for the content;
   calculating, based on an update to an attribute of the user profile, a degree of similarity between the updated attribute of the user profile and a corresponding attribute of the content profile;
   calculating, based on the degree of similarity, an amount of variation of the previously calculated recommendation degree due to the update to the attribute of the user profile; and
   calculating an updated recommendation degree by adding the amount of variation due to the update to the attribute of the user profile to the previously calculated recommendation degree.

6. An information processing apparatus, comprising:
   a storage section configured to store a previously calculated recommendation degree that indicates a degree to which a content is recommended for a user, the previously calculated recommendation degree being based on an existing user profile for the user and a content profile for the content;
   a similarity degree calculation section configured to calculate, based on an update to an attribute of the user profile, a degree of similarity between the updated attribute of the user profile and a corresponding attribute of the content profile;
   a recommendation degree variation calculation section configured to calculate, based on the degree of similarity, an amount of variation of the previously calculated recommendation degree due to the update to the attribute of the user profile; and
   a recommendation degree calculation section configured to calculate an updated recommendation degree by adding the amount of variation due to the update to the attribute of the user profile to the previously calculated recommendation degree.

* * * * *